US009758108B2

(12) United States Patent
Hirakawa et al.

(10) Patent No.: US 9,758,108 B2
(45) Date of Patent: Sep. 12, 2017

(54) PROTECTOR WITH SENSOR

(71) Applicants: NISHIKAWA RUBBER CO., LTD., Hiroshima-shi, Hiroshima-ken (JP); AISIN SEIKI KABUSHIKI KAISHA, Kariya-shi, Aichi-ken (JP)

(72) Inventors: Yuzo Hirakawa, Hiroshima (JP); Michihiko Matsumoto, Hiroshima (JP); Hironori Koeda, Gifu (JP); Tomoki Kameyama, Kariya (JP)

(73) Assignees: NISHIKAWA RUBBER CO., LTD., Hiroshima-Shi (JP); AISIN SEIKI KABUSHIKI KAISHA, Kariya-Shi (JP)

( * ) Notice: Subject to any disclaimer, the term of this patent is extended or adjusted under 35 U.S.C. 154(b) by 42 days.

(21) Appl. No.: 14/941,875

(22) Filed: Nov. 16, 2015

(65) Prior Publication Data

US 2016/0144802 A1 May 26, 2016

(30) Foreign Application Priority Data

Nov. 21, 2014 (JP) .................................. 2014-236599

(51) Int. Cl.
*B60R 13/02* (2006.01)
*E05F 15/44* (2015.01)
*H01H 3/14* (2006.01)

(52) U.S. Cl.
CPC .............. *B60R 13/02* (2013.01); *E05F 15/44* (2015.01); *H01H 3/142* (2013.01);
(Continued)

(58) Field of Classification Search
CPC combination set(s) only.
See application file for complete search history.

(56) References Cited

U.S. PATENT DOCUMENTS 5,920,044 A * 7/1999 Kaji ........................ B60J 10/00
200/61.44

FOREIGN PATENT DOCUMENTS

EP 0638701 A2 2/1995
EP 0767475 A2 4/1997
(Continued)

OTHER PUBLICATIONS

Extended European Search Report issued by the European Patent Office in relation to Application No. 15193110.2-1757 dated Apr. 22, 2016 (7 pages).

*Primary Examiner* — Clayton E Laballe
*Assistant Examiner* — Jas Sanghera
(74) *Attorney, Agent, or Firm* — Robert P. Michal, Esq.; Carter, DeLuca, Farrell & Schmidt, LLP

(57) ABSTRACT

A protector with a sensor comprises: a hollow part; and an installation base member formed on the hollow part. In the hollow part, a plurality of conductive parts have core wires embedded therein respectively and a space is positioned between the plurality of conductive parts. The plurality of conductive parts include: a conductive part on a lower part of the hollow part as a side of the installation base member; and a conductive part on an upper part of the hollow part separated from the side of the installation base member by the space. The hollow part includes: an oblique side on an inner-cabin side extending from an inner-cabin side end connected with the installation base member to a tip; and an oblique side on an outer-cabin side extending from an outer-cabin side end connected with the installation base member to the tip.

12 Claims, 9 Drawing Sheets

(52) U.S. Cl.
CPC ..... *B60R 2013/0287* (2013.01); *E05F 15/443* (2015.01); *E05Y 2900/531* (2013.01)

(56) References Cited

FOREIGN PATENT DOCUMENTS

| | | |
|---|---|---|
| JP | 11-016441 | 1/1999 |
| JP | 3885292 B2 | 2/2007 |
| JP | 2008-044590 A | 2/2008 |

\* cited by examiner 0 (°) degree 20 (°) degrees

PRIOR ART

PRIOR ART

PRIOR ART

PRIOR ART

PROTECTOR WITH SENSOR

CROSS REFERENCE TO RELATED APPLICATION

This application claims the benefit under 35 USC §119 of JP Patent Application JP 2014-236599 filed Nov. 21, 2014, the entire disclosure of which is incorporated herein by reference.

BACKGROUND INFORMATION

The present invention relates to protectors with sensors. When objects including fingers are disposed between openings of automobiles and panels which move between at least two positions to open and close the openings of automobiles, the sensors of the protectors output corresponding signals for detecting the objects. The panels include: doors such as sliding doors on wagons, station wagons or the like sliding frontward and rearward of the automobile bodies and back doors; and sun roofs.

A protector 10, 20 with a sensor is installed on an automobile including a wagon shown in FIG. 6 of which a sliding door 1 (or a back door) moves between at least two positions to open and close an opening of an automobile body or on an automobile shown in FIG. 7 of which sun roof 2 opens or closes the opening of the automobile body.

For example, the protector 10 with the sensor, extending in an upper and lower direction as shown in FIG. 8, is installed on a front end surface of the sliding door 1. The protector 10 with the sensor extends frontward of the automobile body from the front end surface of the sliding door 1.

As shown in FIG. 9 and FIG. 10, the protector 10 with the sensor, installed on the front end surface of the sliding door 1 includes: an installation base member 11 having a substantially U-shaped cross section including an inner-cabin side wall 11a, an outer-cabin side wall 11b and a connecting wall 11c; and a hollow part 12 integrally molded with the installation base member 11. The hollow part 12 includes a sensor (pressure sensitive sensor) 80 which outputs a corresponding electric signal upon detecting the object such as a part of human bodies (fingers, hands or legs) between the sliding door 1 and a body side opening (may also be front door or side door) (see, for example, Japanese unexamined Patent Publication No. 2008-44590 and Japanese examined Patent Publication No. 3885292).

In a lower part of the protector 10 with the sensor, a channel part 13 having a substantially C-shaped cross section is integrally molded with the inner-cabin side wall 11a side of the installation base member 11 for holding wire harness 90 joined with the pressure sensitive sensor 80. The installation base member 11 has a plurality of holding lips 14 formed inside and a core 15 having a substantially U-shaped cross section embedded therein for increasing rigidity. In addition, a decorative lip 16 is provided on the outer-cabin side wall 11b of the installation base member 11.

The sensor (pressure sensitive sensor) 80 has two core wires (electrode wires) 31, 32 extending in an upper and lower direction (longitudinal direction) embedded in rubber like elastic bodies (conductive parts) 34, 35 having conductivity with a space 33 therebetween, which are fixed in the hollow part 12. As the object is disposed between the sliding door 1 and the body side opening when the sliding door 1 is moved towards a closed position, the object makes contact with a part of the hollow part 12, and then the rubber like elastic bodies 34, 35 contact with each other and the two core wires 31, 32 short. Resultant change in electric signal is transmitted to a control unit 40 joined with leads 36, 36 which are connected with the two core wires 31, 32 in a lower side terminal part of the protector 10 with the sensor, and as a result, the objects are detected. The leads 36, 36 covered with insulator are tied by the wire harness 90. Top ends of the leads 36, 36, bared from covered parts 37, 37 are naked wires.

Parts of an inner peripheral surface of the hollow part 12, on which the two rubber like elastic bodies (conductive parts) 34, 35 having conductivity are embedded, are thick in thickness and strong in strength. But other parts of the inner peripheral surface of the hollow part 12 without the conductive parts 34, 35, in other words, the parts of the inner surface of an outer coat of the hollow part 12 in cross section, on which both ends 33a, 33b of a space 33 are continuously provided, are thin in thickness and weak in strength. Accordingly, as shown in FIG. 11, as convex substances 400, automobile keys for example, strongly abut the other parts which are weak in strength while getting on or off the automobiles, the other parts may be damaged or cracked.

The space 33 of FIG. 11 substantially has an oblong shaped (rectangular shaped) cross section. But, depending on shapes or positions of the rubber like elastic bodies 34, 35, the parts of the inner surface of the outer coat of the hollow part 12, on which the both ends 33a, 33b of the space 33 are continuously provided, may be on a side of the installation base member 11 relative to the shape of the hollow part 12 in cross section. In this structure, the parts of the inner surface of the outer coat of the hollow part 12, on which the both ends 33a, 33b of the space 33 are continuously provided, are on positions especially easy to catch the convex substances 400. The structure increases a risk of damages or cracks on the parts.

Once the hollow part 12 cracks, rainwater or water for car washing enters and sensor function is lost. As a result, the structure may cause malfunction including improper opening or closing of the sliding door 1 or the sun roof 2.

It is to be noted that Japanese unexamined Patent Publication No. 2008-44590 aims at fully achieving restoring force of the hollow part after being pressed by: integrally forming a hollow part and a holding part joined to the hollow part through a connection part by thermoplastic elastomer; and forming an inner wall layer on an upper part of an inner surface of the hollow part and a swelled part on a lower part of the inner surface by mixed synthetic resin prepared by mixing carbon by 10% by weight or more with thermoplastic elastomer. But Japanese unexamined Patent Publication No. 2008-44590 does not prevent the damages or cracks on the thin parts of the hollow part when the convex substances 400, automobile keys for example, abut the thin parts, or does not disclose a conception for solving above-mentioned problems.

In addition, since the hollow part and the holding part are connected by the singular connection part, slipping-off of the hollow part may hamper a stable sensor function.

Japanese examined Patent Publication No. 3885292 discloses that a pressure sensitive sensor is inserted through a slit and is adhered by adhesive so that it becomes unnecessary to insert the pressure sensitive sensor in a longitudinal direction of a weather strip, thereby preventing the pressure sensitive sensor from hanging to a downside due to dead weight. But Japanese examined Patent Publication No. 3885292 does not prevent the damages or cracks on the thin parts of the hollow part when the convex substances 400, automobile keys for example, abut the thin parts, or does not disclose a conception for solving above-mentioned problems.

Therefore, an object of the present invention is to provide the protectors with sensors capable of preventing the damages caused by the objects which abut the hollow parts.

SUMMARY

In order to achieve the above-mentioned object, according to one aspect of the invention, a protector with a sensor is provided, the protector with the sensor including:

a hollow part (52) having core wires (31, 32), a plurality of conductive parts (54, 55) and a space (53) provided therein, the plurality of conductive parts (54, 55) having the core wires (31, 32) embedded therein respectively, the space (53) being positioned between the plurality of conductive parts (54, 55); and an installation base member (11) formed on said hollow part (52), wherein:

said plurality of conductive parts (54, 55) include a conductive part (55) on a lower part of the hollow part and a conductive part (54) on an upper part of the hollow part, the conductive part (55) on the lower part of the hollow part being formed on a side of said installation base member (11), the conductive part (54) on the upper part of the hollow part being separated from the side of said installation base member (11) by the space (53); and said hollow part (52) includes an oblique side (52d) on an inner-cabin side and an oblique side (52e) on an outer-cabin side, the oblique side (52d) on the inner-cabin side extending from an inner-cabin side end (52a) to a tip (52c), the oblique side (52e) on the outer-cabin side extending from an outer-cabin side end (52b) to said tip (52c), the inner-cabin side end (52a) being connected with said installation base member (11), the outer-cabin side end (52b) being connected with said installation base member (11).

In addition, according to an aspect of the present invention, the oblique side (52d) on the inner-cabin side and the oblique side (52e) on the outer-cabin side of said hollow part (52) linearly extend at stable angles (150, 160) of inclination.

In addition, according to an aspect of the present invention, said oblique side (52d) on the inner-cabin side extends at an angle (150) of inclination of not more than 70 degrees relative to a datum line (61) on an inner-cabin side on a position of said inner-cabin side end (52a), the datum line (61) on the inner-cabin side extending in an inner and outer cabin direction, and;

the oblique side (52e) on the outer-cabin side extends at an angle (160) of inclination of not more than 70 degrees relative to a datum line (62) on an outer-cabin side on a position of said outer-cabin side end (52b), the datum line (62) on the outer-cabin side extending in the inner and outer cabin direction.

In addition, according to an aspect of the present invention, said datum line (61) on the inner-cabin side is the same as said datum line (62) on the outer-cabin side (61=62); and said angle (150) of inclination of said oblique side (52d) on the inner-cabin side is the same as said angle (160) of inclination of said oblique side (52e) on the outer-cabin side (150=160) of said hollow part (52).

In addition, according to an aspect of the present invention, said hollow part (52) has a triangular shaped cross section.

In addition, according to an aspect of the present invention, said tip (52c) of said hollow part (52) has a curved surface in cross section.

In addition, according to an aspect of the present invention, a distance (110) between said inner-cabin side end (52a) and said outer-cabin side end (52b) of said hollow part (52) is the same as a width of said installation base member (11) in the inner and outer cabin direction.

In addition, according to an aspect of the present invention, said conductive part (55) on the lower part of the hollow part has a convex shape and said conductive part (54) on the upper part of the hollow part has a concave shape in cross section of said hollow part (52), and a distance is uniform between said conductive part (55) on the lower part of the hollow part and the conductive part (54) on the upper part of the hollow part.

In addition, according to an aspect of the present invention, said space (53) has a V-shape and an opening of the V-shape faces the side of said installation base member (11).

In addition, according to an aspect of the present invention, said installation base member (11), said hollow part (52), said conductive parts (54, 55) and said core wires (31, 32) are integrally molded.

Symbols in parentheses show constituents or items corresponding to the drawings.

According to the present invention, the oblique side on the inner-cabin side extends from the inner-cabin side end to the tip and the oblique side on the outer-cabin side extends from the outer-cabin side end to the tip for the hollow part to have the triangular shaped cross section or the like. Accordingly, in case objects including convex substances, automobile keys for example, advance in the inner and outer cabin direction and abut the oblique side on the inner-cabin side or the oblique side on the outer-cabin side, the objects are directed to a side of a top end of the hollow part.

More specifically, the oblique side on the inner-cabin side may extend at the angle of inclination of not more than 70 degrees relative to the datum line on the inner-cabin side on the position of the inner-cabin side end of the hollow part. The datum line on the inner-cabin side extends in the inner and outer cabin direction. Also, the oblique side on the outer-cabin side may extend at the angle of inclination of not more than 70 degrees relative to the datum line on the outer-cabin side on the position of the outer-cabin side end of the hollow part. The datum line on the outer-cabin side extends in the inner and outer cabin direction.

According to the structure, load generated by abutment of the convex substances, automobile keys for example, on the oblique side on the inner-cabin side or the oblique side on the outer-cabin side is forcibly released toward the side of the top end of the hollow part. Accordingly, even in case the convex substances, automobile keys for example, strongly abut the hollow part from an inner-cabin side or an outer-cabin side while getting on or off the automobiles, the structure decreases an impact on the hollow part caused by abutment and efficiently prevents damages or cracks on thin parts of the hollow part.

A slight change of the outer-cabin side of the hollow part in cross section prevents loss of sensor function caused by water entering from the hollow part, thereby preventing malfunction including improper opening or closing of sliding doors or sun roofs.

In order for the convex substances, automobile keys for example, to move toward the side of the top end of the hollow part without getting caught, the oblique side on the inner-cabin side of the hollow part may have a slightly convex shape toward the inner-cabin side and the oblique side on the outer-cabin side may have the slightly convex shape toward the outer-cabin side. But, when the oblique side on the inner-cabin side and the oblique side on the outer-cabin side linearly extend at the stable angles of inclination, the convex substances, automobile keys for example, are guided toward the side of the top end of the hollow part more smoothly and more quickly for moving from (leave) the oblique side on the inner-cabin side or the oblique side on the outer-cabin side.

In addition, the tip of the hollow part has the curved surface in cross section. Accordingly, the convex substances, automobile keys for example, which abut the oblique side on the inner-cabin side or the oblique side on the outer-cabin side slip on the oblique side on the inner-cabin side or the oblique side on the outer-cabin side and are guided to the tip without getting caught. Further, on the tip, the convex substances move toward the side of the top end of the hollow part without getting caught.

According to the structure, when the convex substances, automobile keys for example, abut the hollow part, the convex substances do not get caught on any position on an outer coat of the hollow part. Further, the convex substances are certainly released from the top end of the hollow part. Accordingly, the damages or cracks are prevented on the thin parts of the hollow part, regardless of a position of the thin parts located on the outer coat of the hollow part. Also, scrapes are prevented on thick parts of the hollow part.

In addition, the distance between the inner-cabin side end and the outer-cabin side end of the hollow part in cross section is the same as the width, in the inner and outer cabin direction, between two parts of the installation base member in cross section. The inner-cabin side end and the outer-cabin side end of the hollow part are connected with the two parts of the installation base member. Accordingly, there is no space which the convex substances, automobile keys for example, go into between the installation base member and the hollow part.

In addition, the conductive part having the concave shape on the upper part of the hollow part and the conductive part having the convex shape on the lower part of the hollow part are provided in the hollow part in the manner that the space between the two conductive parts substantially has the V-shaped cross section, the space substantially has the uniform width in cross section and the opening of the V-shaped cross section faces the side of the installation base member. Accordingly, as compared with a space substantially having an oblong shaped (rectangular shaped) cross section, a movable range of the hollow part which bends for detecting objects is wider. The structure enables detection of the objects over wider ranges on the inner-cabin side and the outer-cabin side.

When the space substantially has the V-shaped cross section, as both ends of the space approach the side of the installation base member, the convex substances, automobile keys for example, tend to get caught on the resultant thin parts. The both ends of the space are continuously provided on an inner peripheral surface of the hollow part. Accordingly, the structure is especially effective in that the oblique side on the inner-cabin side and the oblique side on the outer-cabin side of the hollow part incline so that the convex substances, automobile keys for example, forcibly slip on a surface.

In addition, the installation base member, the hollow part, the conductive parts and the core wires are integrally molded. The structure enables to stably produce the protector with the sensor in a shorter time for operation.

The installation base members, the hollow parts, the conductive parts and the core wires of ordinary protectors with the sensors have not been integrally molded.

Japanese examined Patent Publication No. 3885292 discloses that the hollow part of the pressure sensitive sensor includes an oblique side. But the oblique side inclines at the angle of inclination of 75 degrees which is larger than the angle of inclination of the present invention. Accordingly, in case the convex substances, automobile keys for example, advance and abut the oblique side, the convex substances may make inroads into the outer coat surface of the hollow part and cause the damages or cracks.

DETAILED DESCRIPTION

Figure 1:
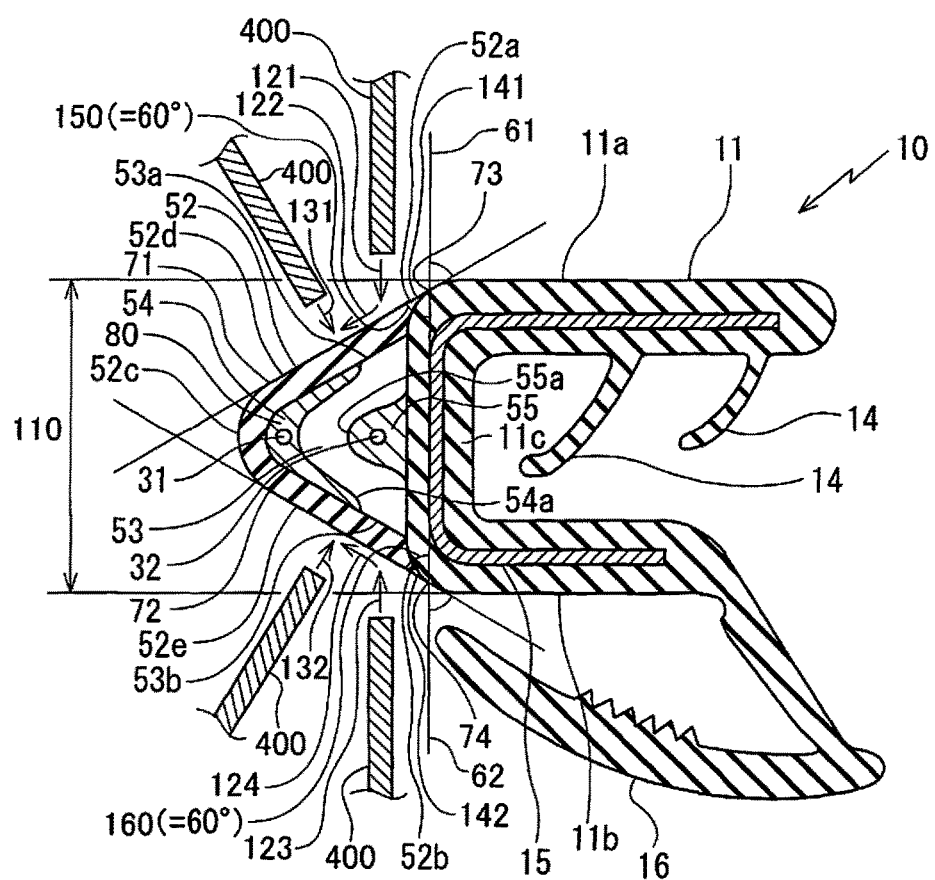
FIG. 1 is an I-I line enlarged cross section of FIG. 8, showing a protector with a sensor according to an embodiment of the present invention.

Referring to the Drawings, a protector with a sensor according to an embodiment of the present invention will be described. It is to be noted that words "a front and a rear" indicate a front direction and a rear direction relative to an automobile. The words "upper and lower" used with respect to the automobile indicate an upper direction and a lower direction relative to the automobile. As to the words "upper and lower" used with respect to a protector 10 with a sensor, the word "upper" indicates a side of a hollow part 52 and the word "lower" indicates a side of an installation base member 11.

Figure 6:
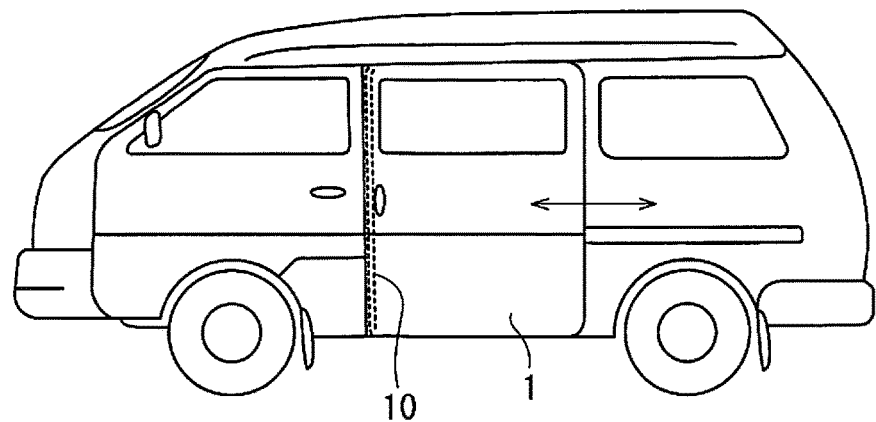
FIG. 6 is a side view of an automobile which opens or closes by a sliding door.
Figure 8:
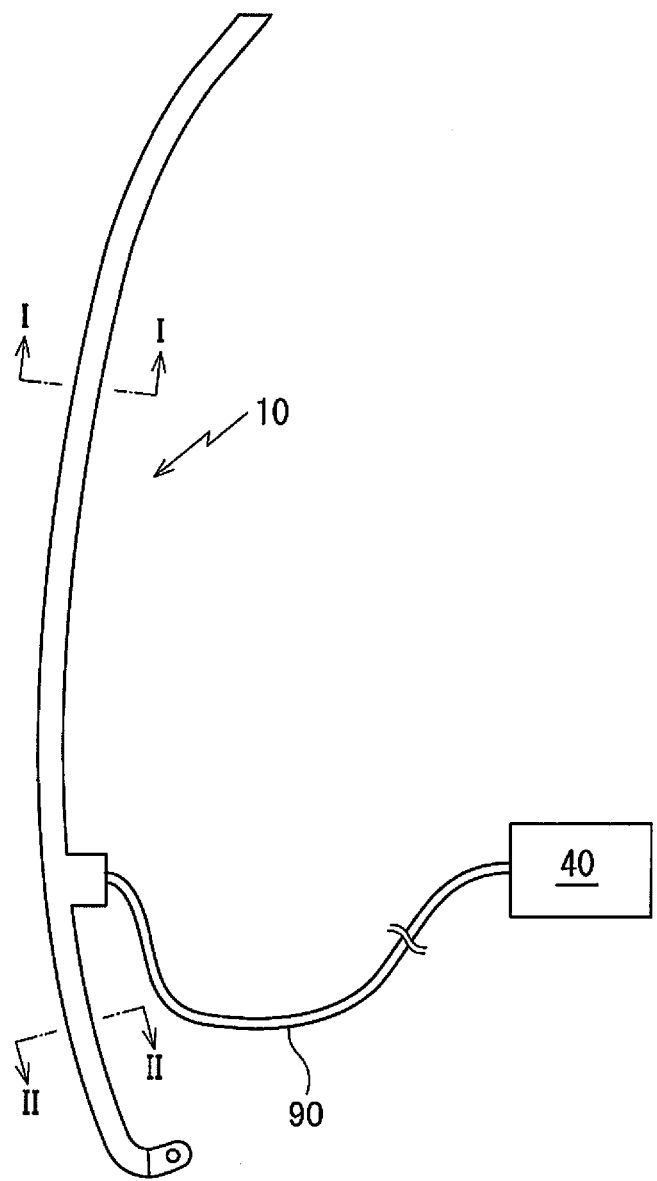
FIG. 8 is a side view of the protector with the sensor of FIG. 6.
Figure 9:
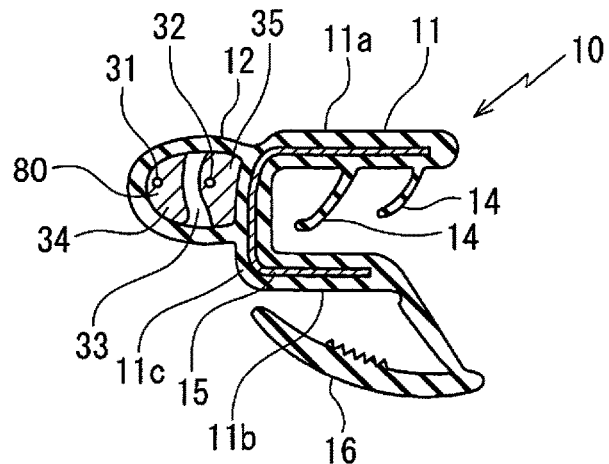
FIG. 9 is an I-I line enlarged cross section of FIG. 8, showing a protector with a sensor.
Figure 10:
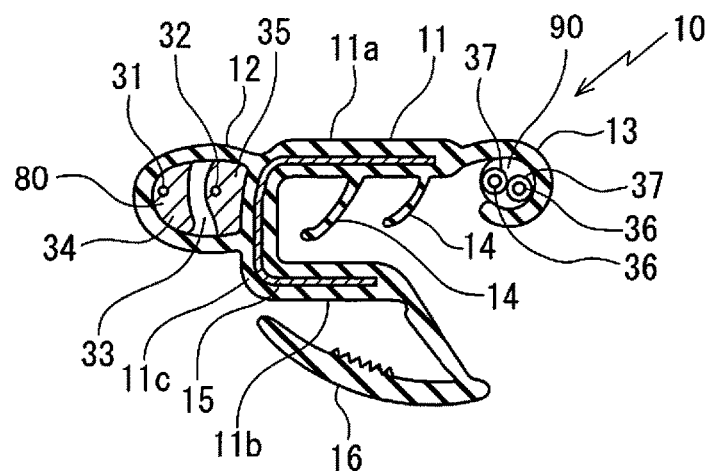
FIG. 10 is an II-II line enlarged cross section of FIG. 8, showing the protector with the sensor.
Figure 11:
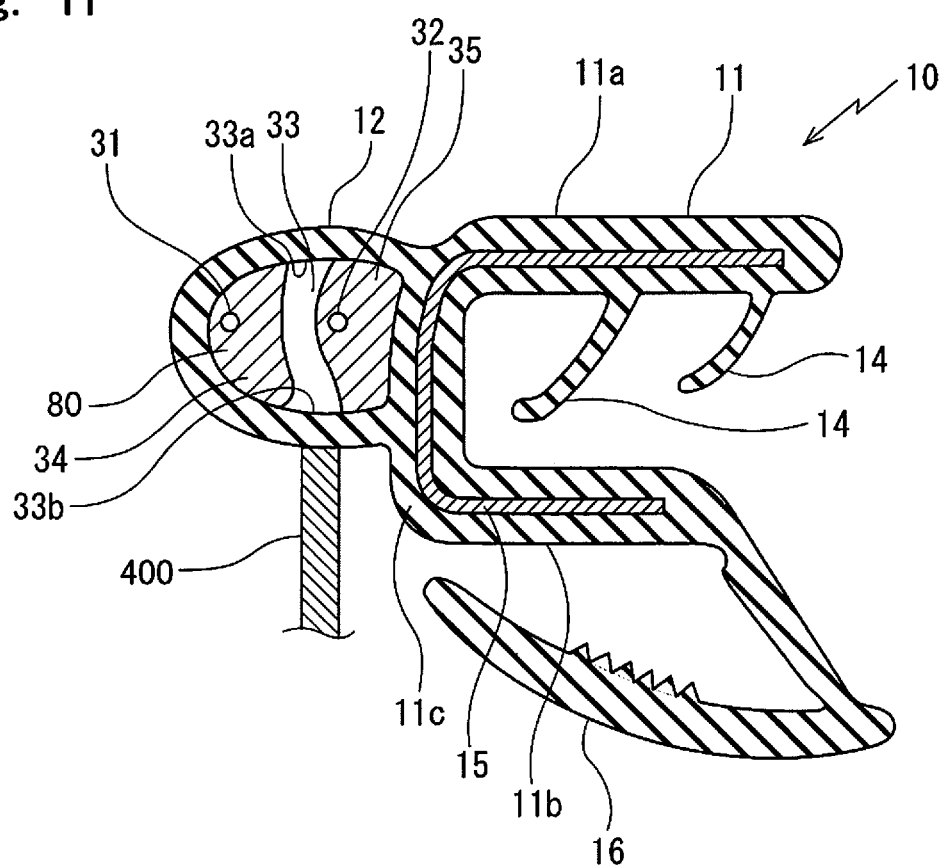
FIG. 11 is an enlarged cross section showing a state that a convex substance including an automobile key abuts the protector with the sensor of FIG. 9.

The protector 10 with the sensor of the embodiment of the present invention, which extends toward a front side of an automobile body is installed on a front end surface of a sliding door 1 of an automobile shown in FIG. 6 of which the sliding door 1 moves between at least two positions to open and close an opening of the automobile body. A sensor (pressure sensitive sensor) 80 installed on the protector 10 with the sensor outputs corresponding electric signal upon detecting an object such as a part of human body (finger, hand or leg) between the sliding door 1 and a body side opening (may also be front door or side door). Both the present invention and the prior art include the structures of FIG. 8. But FIG. 1 of the present invention, which is an I-I line enlarged cross section of a part of FIG. 8 with a sensor (pressure sensitive sensor) 80, is different from the prior art shown in FIG. 9 in that an outer coat of the hollow part 52 substantially has a ridge-shaped cross section. When constituents or items correspond to those in prior arts, the same symbols are used.

As shown in FIG. 1, the protector 10 with the sensor includes: the installation base member 11 having a substantially U-shaped cross section including an inner-cabin side wall 11a, an outer-cabin side wall 11b and a connecting wall 11c, which is operatively coupled on a flange (not shown) formed on a sliding door 1 directly; a hollow part 52 which is integrally molded with the installation base member 11, which has a shape of a tube and which makes elastic contact with the object when the object including a finger is disposed between a front end surface of the sliding door 1 and a body side opening which faces the front end surface when the door 1 is moved towards a closed position; and the sensor (pressure sensitive sensor) 80 which is incorporated in the hollow part 52 and which outputs a corresponding electric signal upon detecting the object. The sensor (pressure sensitive sensor) 80 has two core wires (electrode wires) 31, 32 extending in an upper and lower direction (longitudinal direction) embedded in rubber like elastic bodies 54, 55 having conductivity with a space 53 therebetween, which are fixed in the hollow part 52. The rubber like elastic bodies 54, 55 having conductivity are made of conductive rubber mainly including synthetic rubber including EPDM. The sensor 80 is integrally molded with the hollow part 52 without conductivity.

The installation base member 11 is formed on the hollow part 52. The installation base member 11 has a plurality of holding lips 14, 14 formed inside and a core 15 having a substantially U-shaped cross section embedded therein for increasing rigidity. In addition, a decorative lip 16 is provided on the outer-cabin side wall 11b of the installation base member 11.

The hollow part 52 is integrally molded with the connecting wall 11c of the installation base member 11. A top end of the hollow part 52 protrudes toward a front side of the automobile.

Both ends (an inner-cabin side end) 52a, (an outer-cabin side end) 52b of the hollow part 52 are at a distance from each other and are connected with the installation base member 11.

In the present embodiment, a distance 110 in cross section between the inner-cabin side end 52a and the outer-cabin side end 52b of the hollow part 52 is the same as a width, in the inner and outer cabin direction, between two parts of the installation base member 11 in cross section. The both ends 52a, 52b are connected with the two parts of the installation base member 11. In other words, the distance 110 is the same as an interval (width in the inner and outer cabin direction) under the following conditions. The distance 110 is between a position closest to an inside of an automobile on the inner-cabin side end 52a and a position closest to an outside of the automobile on the outer-cabin side end 52b. The interval (width in the inner and outer cabin direction) is between a position closest to the inside of the automobile on an upper side end of an inner-cabin side wall 11a and a position closest to the outside of the automobile on an upper side end of an outer-cabin side wall 11b of the installation base member 11. The inner-cabin side end 52a forming the outer coat of the hollow part 52 is connected with a corner between the inner-cabin side wall 11a and a connecting wall 11c of the installation base member 11. The outer-cabin side end 52b forming the outer coat of the hollow part 52 is connected with a corner between the outer-cabin side wall 11b and the connecting wall 11c.

The rubber like elastic bodies 54, 55 having conductivity are conductive parts. The conductive parts include: a conductive part 55 on a lower part of the hollow part, which is a side of the installation base member 11 of the hollow part 52; and a conductive part 54 on an upper part of the hollow part, which is a side of a top end of the hollow part 52. The conductive part 54 on the upper part of the hollow part 52 is separated from the side of the installation base member 11 by the space 53. The conductive part 54 on the upper part of the hollow part 52 has a core wire 31 embedded at a center thereof and the conductive part 55 on the lower part of the hollow part 52 has a core wire 32 embedded at a center thereof. In general, the rubber like elastic bodies 54, 55 having conductivity include solid materials without air bubbles therein.

Positions in the hollow part 52 as well as shapes of the conductive part 54 on the upper part of the hollow part and the conductive part 55 on the lower part determine a shape of the space 53 in cross section between the two conductive parts 54, 55. In the present embodiment, the two conductive parts 54, 55 are shaped in a manner that the space 53 substantially has a V-shaped cross section, substantially has a uniform width in cross section and an opening of the V-shaped cross section faces the side of the installation base member 11. Also, an inner-cabin side end 53a and an outer-cabin side end 53b of the space 53 are continuously provided directly on an inner peripheral surface of the hollow part 52 (inner peripheral surface of the outer coat of the hollow part 52). Also, the conductive part 54 on the upper part of the hollow part and the conductive part 55 on the lower part of the hollow part are shaped and positioned in a manner that a part of the inner-cabin side end 53a and a part of the outer-cabin side end 53b are continuously provided directly on the installation base member 11, respectively.

The conductive part 55 on the lower part of the hollow part substantially has a ridge-shaped cross section, a base of which comes into contact with the connecting wall 11c of the installation base member 11. The conductive part 54 on the upper part of the hollow part substantially has a crescent-shaped cross section, both ends of which fall from the top end of the hollow part 52 in a manner to approach the connecting wall 11c of the installation base member 11.

In addition, lower parts 54a of the conductive part 54 on the upper part of the hollow part are closer to the installation base member 11 than a tip 55a of the conductive part 55 on the lower part of the hollow part. Accordingly, even slight bending easily touches the two conductive parts 54, 55 to each other, and the two conductive parts 54, 55 do not pass each other on a point of contact. In addition, an axis of symmetry bilaterally divides the two conductive parts 54, 55 and the space 53 in the hollow part 52 as well as the hollow part 52 into two equal halves in a direction of an inner-cabin side and in a direction of an outer-cabin side. Also, the core wires 31, 32 are on the axis of symmetry.

Figure 2:
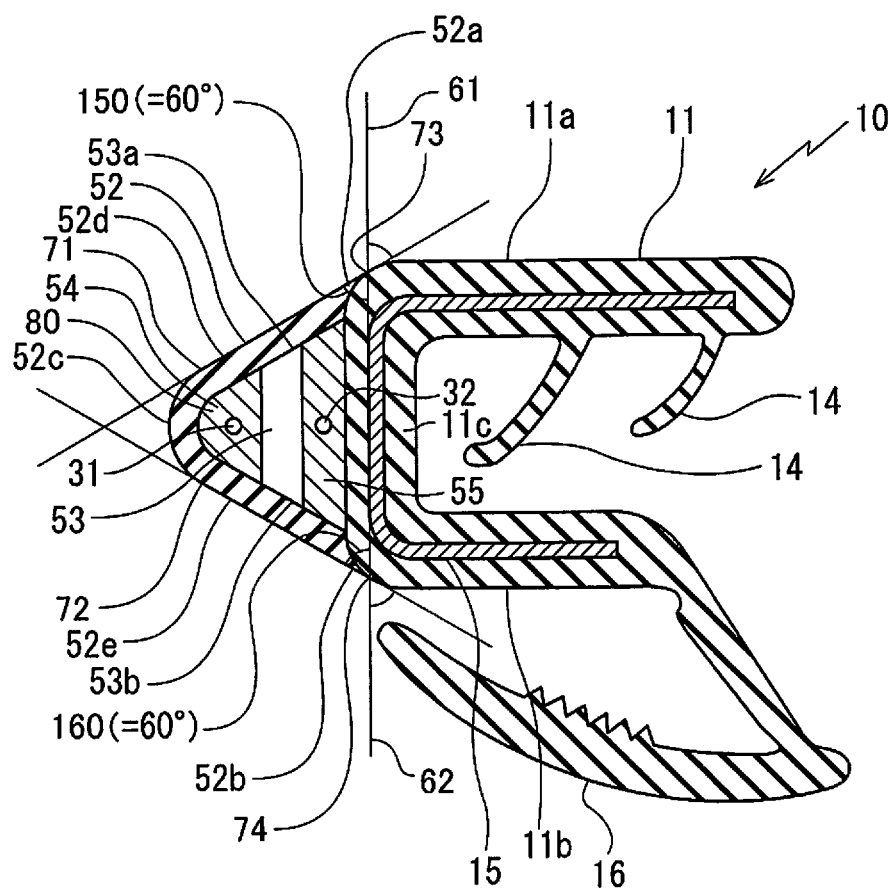
FIG. 2 is an I-I line enlarged cross section of FIG. 8, showing another protector with a sensor according to the embodiment of the present invention.

As shown in FIG. 2, the space 53 may substantially have an oblong shaped (rectangular shaped) cross section. But the space 53 substantially having the V-shaped cross section (FIG. 1) widens a movable range of the outer coat of the hollow part 52 which bends for detecting the objects. As a result, the space 53 substantially having the V-shaped cross section enables detection of the objects over wider ranges on the inner-cabin side and the outer-cabin side.

The installation base member 11 and the hollow part 52 of the protector 10 with the sensor may be formed by an extrusion molded part made of a rubber like elastic body without conductivity including: synthetic rubber such as EPDM; and thermoplastic elastomer such as TPO, TPS. The upper and lower side terminal parts of the protector 10 with the sensor relative to the automobile are die molded for arranging an external shape thereof. Since the hollow part 52 of the protector 10 with the sensor necessitates flexibility, the hollow part 52 may include a foamed sponge material. In the same manner, the installation base member 11 may include the foamed sponge material.

The outer coat (wall forming the hollow part) of the hollow part 52 substantially has the ridge-shaped cross section. The hollow part 52 includes a tip 52c having a curved surface. The hollow part 52 including an oblique side 52d on an inner-cabin side and an oblique side 52e on an outer-cabin side as two equilaterals, together with the connecting wall 11c of the installation base member 11 forms the triangular shaped cross section.

The oblique side 52d on the inner-cabin side forming the ridge-shape extends at an angle of inclination of 60 degrees relative to a datum line 61 on an inner-cabin side, on a position of the inner-cabin side end 52a of the hollow part 52. The datum line 61 on the inner-cabin side extends in the inner and outer cabin direction of the automobile via a position 73 closest to the inside of the automobile on the inner-cabin side end 52a of the hollow part 52. In the same manner, the oblique side 52e on the outer-cabin side forming the ridge-shape extends at the angle of inclination of 60 degrees relative to a datum line 62 on an outer-cabin side, on a position of the outer-cabin side end 52b of the hollow part 52. The datum line 62 on the outer-cabin side extends in the inner and outer cabin direction of the automobile via a position 74 closest to an outside of the automobile on the outer-cabin side end 52b of the hollow part 52. In the present embodiment, the datum lines 61, 62 form a singular line which is substantially in parallel with the connecting wall 11c of the installation base member 11. Also, the datum lines 61, 62 are substantially at right angles to a flange of the automobile, not shown, on which the installation base member 11 is operatively coupled.

The oblique side 52d on the inner-cabin side linearly extends from the position 73 closest to the inside of the automobile on the inner-cabin side end 52a of the hollow part 52 to a position 71 on an inner-cabin side on which the curved surface of the tip 52c starts. The oblique side 52e on the outer-cabin side linearly extends from the position 74 closest to the outside of the automobile on the outer-cabin side end 52b of the hollow part 52 to a position 72 on an outer-cabin side on which the curved surface of the tip 52c starts.

According to the protector 10 with the sensor, the outer coat of the hollow part 52 substantially has the ridge-shaped cross section. Also, the oblique side 52d on the inner-cabin side and the oblique side 52e on the outer-cabin side extend at the angles 150, 160 of inclination of 60 degrees relative to the datum line 61 on the inner-cabin side and the datum line 62 on the outer-cabin side, respectively. Accordingly, as shown in FIG. 1, in case the convex substances 400, automobile keys for example, advance from the inner-cabin side to the outer-cabin side in parallel with the datum line 61 on the inner-cabin side (in a direction indicated by an arrow 121) for example, and abut the oblique side 52d on the inner-cabin side which extends at the angle 150 of inclination, the convex substances 400 incline toward a side of the top end of the hollow part 52 as indicated by an arrow 122. In the same manner, in case the convex substances 400, automobile keys for example, advance from the outer-cabin side to the inner-cabin side in parallel with the datum line 62 on the outer-cabin side (in a direction indicated by an arrow 123) and abut the oblique side 52e on the outer-cabin side which extends at the angle 160 of inclination, the convex substances 400 incline toward the side of the top end of the hollow part 52 as indicated by an arrow 124.

According to the structure, load generated by abutment of the convex substances 400, automobile keys for example, on the oblique side 52d on the inner-cabin side or the oblique side 52e on the outer-cabin side is forcibly released toward the side of the top end of the hollow part 52. Accordingly, even in case convex substances 400, automobile keys for example, strongly abut the hollow part from the inner-cabin side or the outer-cabin side while getting on or off the automobiles, the structure decreases an impact on the hollow part 52 caused by the abutment and efficiently prevents damages or cracks on thin parts of the hollow part 52.

The tip 52c of the hollow part 52 has the curved surface. In addition, the oblique side 52d on the inner-cabin side of the hollow part 52 linearly extends at a large and stable angle 150 of inclination of 60 degrees from the inner-cabin side end 52a of the hollow part 52 to the position 71 on the inner-cabin side on which the curved surface of the tip 52c starts. Also, the oblique side 52e on the outer-cabin side of the hollow part 52 linearly extends at a large and stable angle 160 of inclination of 60 degrees from the outer-cabin side end 52b of the hollow part 52 to the position 72 on the outer-cabin side on which the curved surface of the tip 52c starts. Accordingly, the convex substances 400, automobile keys for example, which abut the oblique side 52d on the inner-cabin side or the oblique side 52e on the outer-cabin side slip on the oblique side 52d on the inner-cabin side or the oblique side 52e on the outer-cabin side and are guided to the tip 52c without getting caught. Further, on the tip 52c, the convex substances 400 move toward the side of the top end of the hollow part 52 without getting caught.

According to the structure, when the convex substances 400, automobile keys for example, abut the hollow part 52, the convex substances 400 do not get caught on any position on the outer coat of the hollow part 52. Further, the convex substances are certainly released from the top end of the hollow part 52. Accordingly, the damages or cracks are prevented on the thin parts of the hollow part 52, regardless of a position of the thin parts located on the outer coat of the hollow part 52. Also, scrapes are prevented on thick parts of the hollow part 52.

A slight change in a cross sectional shape of the hollow part 52 prevents loss of sensor function caused by water entering from the hollow part 52, thereby preventing malfunction including improper opening or closing of sliding doors 1 or sun roofs 2.

Also, as shown in FIG. 1, in case the convex substances 400, automobile keys for example, abut the oblique side 52d on the inner-cabin side in a direction 131, the oblique side 52d on the inner-cabin side is not subjected to a frontal impact from the convex substances 400 and the impact is decreased. The direction 131 inclines at a certain angle relative to the datum line 61 on the inner-cabin side and may be substantially at a right angle to the oblique side 52d on the inner-cabin side. This is because the oblique side 52d on the inner-cabin side of the hollow part 52 inclines at the angle 150 of inclination and is formed on the connecting wall 11c of the installation base member 11, so that the oblique side 52d on the inner-cabin side abutted by the convex substances 400 bends and easily gets closer to a side of the connecting wall 11c while a connecting part 141 between the oblique side 52d on the inner-cabin side and the connecting wall 11c functions as a fulcrum. In the same manner, in case the convex substances 400, automobile keys for example, advance from the outer-cabin side to the inner-cabin side (in a direction indicated by an arrow 132) and abut the oblique side 52e on the outer-cabin side, the impact from the convex substances 400 is decreased. The direction 132 inclines at a certain angle relative to the datum line 62 on the outer-cabin side. This is because the oblique side 52e on the outer-cabin side inclines at the angle 160 of inclination and is formed on the connecting wall 11c of the installation base member 11, so that the oblique side 52e on the outer-cabin side abutted by the convex substances 400 bends and easily gets closer to the side of the connecting wall 11c while a connecting part 142 between the oblique side 52e on the outer-cabin side and the connecting wall 11c functions as a fulcrum.

In FIG. 1, an inner-cabin side end 53a and an outer-cabin side end 53b of the space 53 in the hollow part 52 are continuously provided directly on an inner peripheral surface of the hollow part 52 (inner peripheral surface of the outer coat of the hollow part 52). Also, a part of the inner-cabin side end 53a and a part of the outer-cabin side end 53b are shaped and positioned to be continuously provided directly on the installation base member 11, respectively. The rubber like elastic bodies 54, 55 having conductivity (the conductive part 54 on the upper part of the hollow part, the conductive part 55 on the lower part of the hollow part), relatively high in rigidity do not cover the connecting part 141 and the connecting part 142. When objects collide with the hollow part 52, the oblique sides 52d, 52e can bend and easily get closer to the side of the connecting wall 11c around the connecting part 141 and the connecting part 142. In addition, when the convex substances 400 abut surroundings of the connecting parts 141, 142, the conductive part 54 on the upper part of the hollow part easily contacts with the conductive part 55 on the lower part of the hollow part. This is because the conductive part 54 on the upper part is on the side of the top end of the oblique side 52d on the inner-cabin side and the oblique side 52e on the outer-cabin side. Accordingly, even in case the oblique side 52d on the inner-cabin side or the oblique side 52e on the outer-cabin side slightly bends toward the side of the connecting wall 11c, displacement is large on the side of the top end of the oblique side 52d on the inner-cabin side and the oblique side 52e on the outer-cabin side. The protector 10 with the sensor sensitively detects collisions of the objects and terminates the collisions by moving or stopping the doors for protecting the hollow part 52 from the direct collisions of the objects over a long period of time and decreasing damages. Bendability of the oblique side 52d on the inner-cabin side and the oblique side 52e on the outer-cabin side for getting closer to the side of the connecting wall 11c around the connecting parts 141, 142 is improved by thinning the thickness, forming concave shaped openings on the connecting parts 141, 142 of the hollow part 52, for example.

In FIG. 1 and FIG. 2, the oblique side 52d on the inner-cabin side and the oblique side 52e on the outer-cabin side of the hollow part 52 extend at the angles 150, 160 of inclination of 60 degrees, but the angles 150, 160 of inclination are not limited to 60 degrees. The angle 150 of inclination is an angle for directing the convex substances 400, automobile keys for example, to the side of the top end of the hollow part 52 in case the convex substances 400 advance in parallel with the datum line 61 on the inner-cabin side and abut the oblique side 52d on the inner-cabin side. In the same manner, the angle 160 of inclination is an angle for directing the convex substances 400, automobile keys for example, to the side of the top end of the hollow part 52 in case the convex substances 400 advance in parallel with the datum line 62 on the outer-cabin side and abut the oblique side 52e on the outer-cabin side.

Figure 3A:
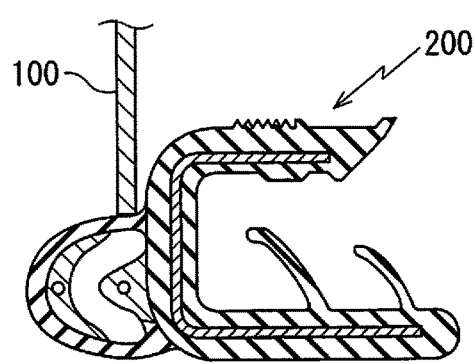
FIG. 3(*a*) and FIG. 3(*b*) are schematic diagrams of an experiment for checking slippage of a minus driver by leaning the protector with the sensor relative to a direction in which the minus driver advances.
Figure 3B:
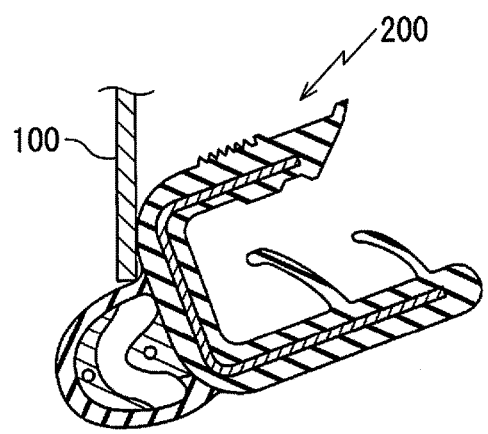

As shown in FIG. 3(a) and FIG. 3(b), an experiment was performed on an angle at which a top end of a minus screw driver 100 slips, by leaning a protector 200 with a sensor every 5 degree intervals relative to a direction in which the minus screw driver 100 as the convex substance 400 including keys advances. Specifically, the experiment used a Ford Laboratory Test Methods testing machine and was performed by: fixing the protector 200 with the sensor on the flange as a jig; rotating the protector 200 with the sensor; and sticking the minus screw driver 100 on an outer coat surface of a hollow part for checking whether the top end of the minus screw driver 100 makes inroads or slips. The top end of the minus screw driver 100 was 4 mm (milli-meter) wide and 0.6 mm (milli-meter) thick.

FIG. 3(a) shows that the minus screw driver 100 linearly advances in a direction perpendicular to the protector 200 with the sensor which does not incline, and is stuck on the outer coat surface of the hollow part. FIG. 3(b) shows that the protector 200 with the sensor inclines at 20 degrees relative to a level surface (70(°) degrees relative to a perpendicular surface), and then the minus screw driver 100 linearly advances in the perpendicular direction and is stuck on the outer coat surface of the hollow part.

Chart 1 shows results of the experiment. The experiment was repeatedly performed using three samples under the same condition.

CHART 1

| angle (°) | sample No | | |
|---|---|---|---|
| | 1 | 2 | 3 |
| 0 | X | X | X |
| 5 | X | X | X |
| 10 | X | X | X |
| 15 | X | X | X |
| 20 | ○ | ○ | ○ |

The results of the experiment show that, when the protector 200 with the sensor inclines at a (°) degree that falls within a range of 0 to 15 relative to the level surface (a range of 90 to 75(°) degrees relative to the perpendicular surface), the top end of the minus screw driver 100 makes inroads on the outer coat surface of the hollow part (indicated by a mark "X"). When the protector 200 with the sensor inclines at 20 (°) degrees relative to the level surface (70(°) degrees relative to the perpendicular surface), the top end of the minus screw driver 100 does not make inroads and slips on the outer coat surface of the hollow part (indicated by a mark "○".

Accordingly, the oblique side 52d on the inner-cabin side forming the outer coat of the hollow part 52 may extend at any angle 150 of inclination that is not more than 70(°) degrees relative to the datum line 61 on the inner-cabin side. Also, the oblique side 52e on the outer-cabin side forming the outer coat of the hollow part 52 may extend at any angle 160 of inclination that is not more than 70(°) degrees relative to the datum line 62 on the outer-cabin side.

In the present embodiment, the angle 150 of inclination of the oblique side 52*d* on the inner-cabin side is 60(°) degrees and is equal to the angle 160 of inclination of the oblique side 52*e* on the outer-cabin side. But the angle 150 of inclination and the angle 160 of inclination are not necessarily the same angles as long as the angles 150,160 are not more than 70(°) degrees.

Figure 4:
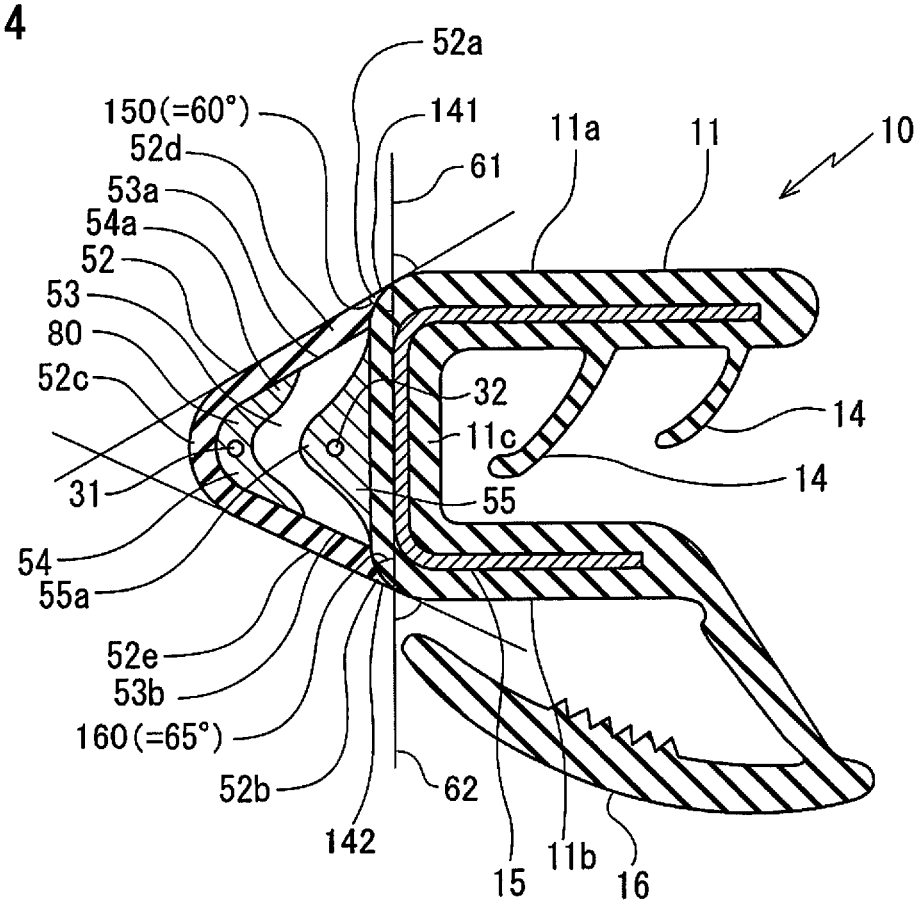
FIG. 4 is an I-I line enlarged cross section of FIG. 8, showing another protector with a sensor according to the embodiment of the present invention.

For example, as shown in FIG. 4, the angle 150 of inclination of the oblique side 52*d* on the inner-cabin side may be 60(°) degrees and the angle 160 of inclination of the oblique side 52*e* on the outer-cabin side may be 65(°) degrees. Also, FIG. 4 shows that an inner-cabin side end 53*a* and an outer-cabin side end 53*b* of the space 53 are: continuously provided directly on an inner peripheral surface of the hollow part 52 (inner peripheral surface of the outer coat of the hollow part 52); not continuously provided directly on the installation base member 11; and continuously provided on the connecting part 141 on the inner-cabin side and the connecting part 142 on the outer-cabin side. In this case also, the rubber like elastic bodies 54, 55 having conductivity (the conductive part 54 on the upper part of the hollow part, the conductive part 55 on the lower part of the hollow part), relatively high in rigidity do not cover the connecting part 141 and the connecting part 142. Accordingly when objects collide with the hollow part 52, the oblique sides 52*d*, 52*e* are easily inclined and bent around the connecting part 141 and the connecting part 142.

Figure 5:
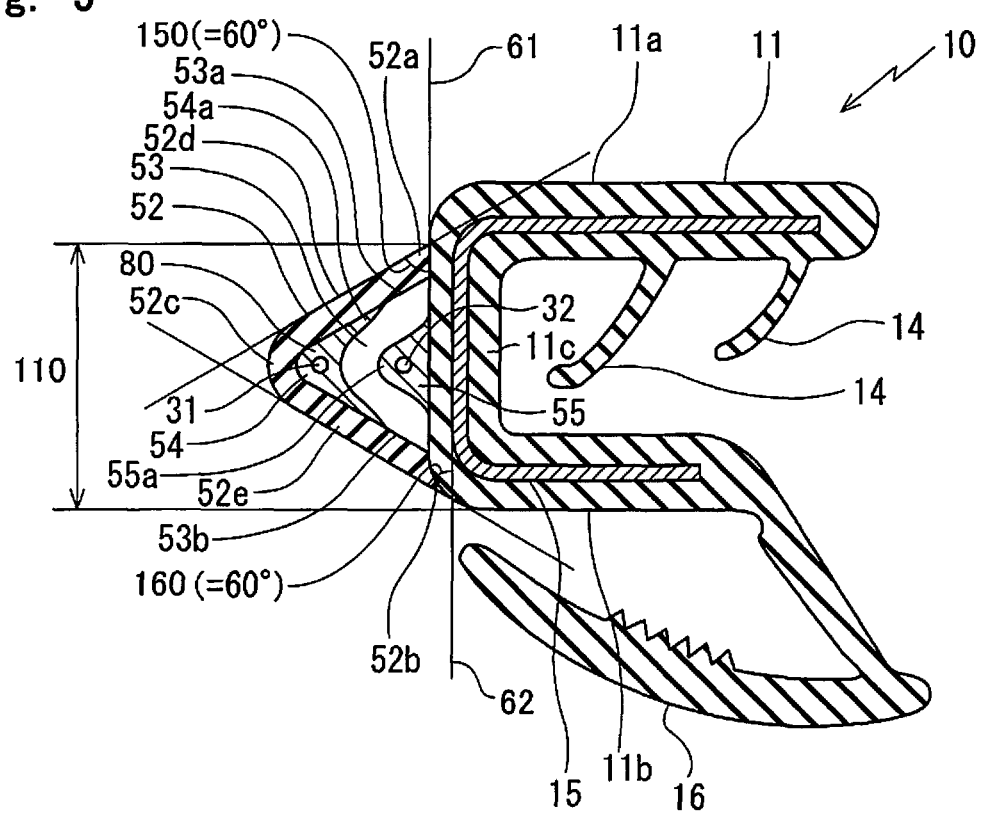
FIG. 5 is an I-I line enlarged cross section of FIG. 8, showing another protector with a sensor according to the embodiment of the present invention.

In the present embodiment, the datum line 61 on the inner-cabin side and the datum line 62 on the outer-cabin side form the singular line. But, as shown in FIG. 5, the datum lines 61, 62 may be two different lines which are in parallel with each other and separated from each other. In this case also, the datum lines 61, 62 are substantially in parallel with the connecting wall 11*c* of the installation base member 11. Also, the datum line 61 on the inner-cabin side and the datum line 62 on the outer-cabin side are substantially at right angles to the flange of an automobile, not shown, on which the installation base member 11 is operatively coupled. In FIG. 5, the distance 110 between the inner-cabin side end 52*a* and the outer-cabin side end 52*b* of the hollow part 52 is shorter than the width, in the inner and outer cabin direction, between two parts of the installation base member 11 on which the both ends 52*a*, 52*b* are connected. The inner-cabin side end 52*a* of the hollow part 52 is connected with a position which is: slightly at a distance from the corner on which the connecting wall 11*c* and the inner-cabin side wall 11*a* of the installation base member 11 are continuously provided; and closer to (approaching) the outside of the automobile than the corner. The outer-cabin side end 52*b* of the hollow part 52 is connected with the corner on which the connecting wall 11*c* and the outer-cabin side wall 11*b* of the installation base member 11 are continuously provided.

While the present embodiment specifies an example that the installation base member 11, the hollow part 52 and the sensor 80 are integrally molded, the installation base member 11, the hollow part 52 and the sensor 80 may be separately molded so that the installation base member 11 and the hollow part 52 are fixed by adhesive or adhesive tape, and the sensor 80 is inserted in the hollow part 52 for unification. Alternatively, any two of the installation base member 11, the hollow part 52 and the sensor 80 may be integrally molded and a remaining member is separately molded.

In the present embodiment, the installation base member 11 has a plurality of holding lips 14 formed inside and a core 15 having a substantially U-shaped cross section embedded therein. But the installation base member 11 may have only one holding lip 14, 14 or may be without the core 15 embedded therein. Also, the installation base member 11 may have any shape as long as the installation base member 11 has a part thereof for fixing the hollow part 52 and the sensor 80 thereon, of which examples include the U-shaped cross section of the present embodiment. Methods of fixing the hollow part 52 and the sensor 80 on the sliding door 1 vary, including use of adhesive tape as well as gripping and fitting the hollow part 52 and the sensor 80.

The present embodiment specifies an example that the protector 10 with the sensor is installed on the sliding door 1 side of the automobile, which slides frontward and rearward. But the protector 10 with the sensor may be installed on the body side opening for detecting the object between the sliding door and the body side opening.

Figure 7:
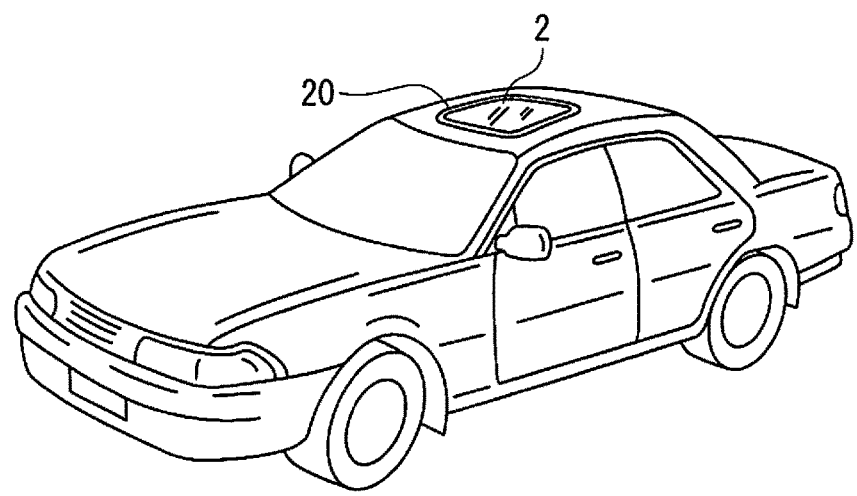
FIG. 7 is a perspective view of an automobile with a sun roof.

Also, the protector 10 with the sensor is applicable to a back door or a sun roof 2 (FIG. 7).

We claim:

1. A protector with a sensor comprising: a hollow part having core wires, a plurality of conductive parts and a space provided therein, the plurality of conductive parts having the core wires embedded therein respectively, the space being positioned between the plurality of conductive parts; and an installation base member formed on said hollow part, wherein:

said plurality of conductive parts include a conductive part on a lower part of the hollow part and a conductive part on an upper part of the hollow part, the conductive part on the lower part of the hollow part being formed on a side of said installation base member, the conductive part on the upper part of the hollow part being separated from the side of said installation base member by the space;

said hollow part includes an oblique side on an inner-cabin side and an oblique side on an outer-cabin side, the oblique side on the inner-cabin side extending from an inner-cabin side end to a tip, the oblique side on the outer-cabin side extending from an outer-cabin side end to said tip, the inner-cabin side end being connected with said installation base member, the outer-cabin side end being connected with said installation base member; and said conductive part on the lower part of the hollow part has a convex shape and said conductive part on the upper part of the hollow part has a concave shape in cross section of said hollow part, and a distance is uniform between said conductive part on the lower part of the hollow part and the conductive part on the upper part of the hollow part.

2. The protector with the sensor as claimed in claim 1, wherein: the oblique side on the inner-cabin side and the oblique side on the outer-cabin side of said hollow part linearly extend at stable angles of inclination.

3. The protector with the sensor as claimed in claim 2, wherein: said oblique side on the inner-cabin side extends at an angle of inclination of not more than 70 degrees relative to a datum line on an inner-cabin side on a position of said inner-cabin side end, the datum line on the inner-cabin side extending in an inner and outer cabin direction, and;

the oblique side on the outer-cabin side extends at an angle of inclination of not more than 70 degrees relative to a datum line on an outer-cabin side on a position of said outer-cabin side end, the datum line on the outer-cabin side extending in the inner and outer cabin direction.

4. The protector with the sensor as claimed in claim 3, wherein: said datum line on the inner-cabin side is the same as said datum line on the outer-cabin side; and said angle of inclination of said oblique side on the inner-cabin side is the same as said angle of inclination of said oblique side on the outer-cabin side of said hollow part.

5. The protector with the sensor as claimed in claim 4, wherein: said hollow part has a triangular shaped cross section.

6. The protector with the sensor as claimed in claim 3, wherein: said hollow part has a triangular shaped cross section.

7. The protector with the sensor as claimed in claim 2, wherein: said hollow part has a triangular shaped cross section.

8. The protector with the sensor as claimed in claim 1, wherein: said oblique side on the inner-cabin side extends at an angle of inclination of not more than 70 degrees relative to a datum line on an inner-cabin side on a position of said inner-cabin side end, the datum line on the inner-cabin side extending in an inner and outer cabin direction, and; the oblique side on the outer-cabin side extends at an angle of inclination of not more than 70 degrees relative to a datum line on an outer-cabin side on a position of said outer-cabin side end, the datum line on the outer-cabin side extending in the inner and outer cabin direction.

9. The protector with the sensor as claimed in claim 8, wherein: said datum line on the inner-cabin side is the same as said datum line on the outer-cabin side; and said angle of inclination of said oblique side on the inner-cabin side is the same as said angle of inclination of said oblique side on the outer-cabin side of said hollow part.

10. The protector with the sensor as claimed in claim 9, wherein: said hollow part has a triangular shaped cross section.

11. The protector with the sensor as claimed in claim 8, wherein: said hollow part has a triangular shaped cross section.

12. The protector with the sensor as claimed in claim 1, wherein: said hollow part has a triangular shaped cross section.

* * * * *